(12) United States Patent
Mergener et al.

(10) Patent No.: US 8,528,782 B2
(45) Date of Patent: Sep. 10, 2013

(54) GREASE GUN

(75) Inventors: Matthew J. Mergener, Germantown, WI (US); Jonathan A. Zick, Waukesha, WI (US); Scott D. Eisenhardt, Pewaukee, WI (US); Troy C. Thorson, Cedarburg, WI (US); Brandon L. Verbrugge, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 13/572,085

(22) Filed: Aug. 10, 2012

(65) Prior Publication Data

US 2013/0119081 A1    May 16, 2013

Related U.S. Application Data

(60) Provisional application No. 61/521,903, filed on Aug. 10, 2011, provisional application No. 61/521,987, filed on Aug. 10, 2011, provisional application No. 61/612,835, filed on Mar. 19, 2012, provisional application No. 61/612,846, filed on Mar. 19, 2012, provisional application No. 61/613,888, filed on Mar. 21, 2012.

(51) Int. Cl.
*B67D 7/22* (2010.01)
*B67B 7/00* (2006.01)
*G01F 11/00* (2006.01)

(52) U.S. Cl.
USPC ............ 222/37; 222/1; 222/36; 222/256; 222/262; 222/333

(58) Field of Classification Search
USPC ............ 222/1, 36, 37, 63, 256–262, 333; 184/105.1, 105.2
See application file for complete search history.

(56) References Cited

U.S. PATENT DOCUMENTS

| 275,207 A | 4/1883 | Hayden |
| 1,339,916 A | 5/1920 | Boe |

(Continued)

FOREIGN PATENT DOCUMENTS

| EP | 1666786 | 6/2006 |
| EP | 2199653 | 6/2010 |

(Continued)

OTHER PUBLICATIONS

Milwaukee Electric Tool Corporation, "12 Volt Grease Gun," Service Parts List, May 2010, 2 pages, Catalog No. 2446-20, Brookfield, USA.

(Continued)

*Primary Examiner* — Kevin P Shaver
*Assistant Examiner* — Nicholas J Weiss
(74) *Attorney, Agent, or Firm* — Michael Best & Friedrich LLP

(57) ABSTRACT

A grease gun includes a housing, a motor positioned within the housing, a pump assembly coupled to and driven by the motor, and a chamber supported by the housing in fluid communication with the pump assembly. The chamber is configured to store a liquid. The grease gun also includes an outlet in fluid communication with the chamber and a measurement system operable to measure an amount of liquid being dispensed through the outlet. The measurement system monitors a change in current of the motor over a cycle of the pump assembly, compares the change in current to a predetermined value, and, if the change in current is greater than the predetermined value, increases a pump cycle counter to indicate that liquid was dispensed.

20 Claims, 7 Drawing Sheets

(56) References Cited

U.S. PATENT DOCUMENTS

| | | | |
|---|---|---|---|
| 1,926,399 A | 9/1933 | Nielsen | |
| 2,106,217 A | 1/1938 | Johnson | |
| 2,615,598 A | 10/1952 | Watkins et al. | |
| 3,718,162 A | 2/1973 | Dafler et al. | |
| 3,938,623 A | 2/1976 | Winston et al. | |
| 3,987,869 A | 10/1976 | Bowers | |
| 4,082,121 A | 4/1978 | Sturm et al. | |
| 4,106,522 A | 8/1978 | Manesse | |
| 4,113,151 A | 9/1978 | Brown et al. | |
| 4,134,523 A | 1/1979 | Hansen et al. | |
| 4,257,540 A | 3/1981 | Wegmann et al. | |
| 4,298,144 A | 11/1981 | Pressl | |
| 4,299,238 A | 11/1981 | Baidwan et al. | |
| 4,331,262 A * | 5/1982 | Snyder et al. | 222/37 |
| 4,445,168 A | 4/1984 | Petryszyn | |
| 4,662,540 A | 5/1987 | Schroter | |
| 4,852,772 A | 8/1989 | Ennis, III | |
| 4,946,077 A | 8/1990 | Olsen | |
| 4,951,848 A | 8/1990 | Keller | |
| 4,978,037 A | 12/1990 | Schuckmann | |
| 4,994,984 A | 2/1991 | Massimo | |
| 5,042,695 A | 8/1991 | Battegazzore | |
| 5,182,938 A | 2/1993 | Merkel | |
| 5,556,009 A | 9/1996 | Motzko | |
| 5,565,770 A | 10/1996 | Jones | |
| 5,713,723 A | 2/1998 | Hathaway | |
| 5,884,818 A | 3/1999 | Campbell | |
| 6,135,327 A | 10/2000 | Post et al. | |
| 6,216,822 B1 | 4/2001 | May et al. | |
| 6,679,352 B2 | 1/2004 | Gillespie | |
| 6,722,530 B1 | 4/2004 | King et al. | |
| 6,834,781 B1 | 12/2004 | Mueller | |
| 6,854,620 B2 * | 2/2005 | Ramey | 222/63 |
| 6,889,872 B2 | 5/2005 | Herman et al. | |
| 7,004,357 B2 | 2/2006 | Shew | |
| 7,032,713 B2 | 4/2006 | Huang et al. | |
| 7,178,700 B2 | 2/2007 | Song et al. | |
| 7,228,941 B2 | 6/2007 | Weigand et al. | |
| 7,249,695 B2 | 7/2007 | Shew | |
| 7,267,198 B2 | 9/2007 | Cen | |
| 7,392,882 B2 | 7/2008 | Chen | |
| 7,523,843 B2 | 4/2009 | Shew et al. | |
| 7,594,622 B2 * | 9/2009 | Witt et al. | 242/563.2 |
| 7,621,428 B2 | 11/2009 | Springhorn | |
| 7,828,119 B1 | 11/2010 | Schirado | |
| 7,874,464 B2 | 1/2011 | Prague et al. | |
| 7,970,558 B1 | 6/2011 | Roys | |
| 7,997,456 B2 | 8/2011 | Shew et al. | |
| 8,020,727 B2 | 9/2011 | Herman et al. | |
| 8,167,168 B2 | 5/2012 | Reynolds | |
| 2004/0007598 A1 | 1/2004 | Barrett | |
| 2004/0211576 A1 | 10/2004 | Milbourne et al. | |
| 2005/0242126 A1 | 11/2005 | Izoe | |
| 2006/0060426 A1 | 3/2006 | Chen | |
| 2006/0070812 A1 | 4/2006 | Eggleton | |
| 2006/0108180 A1 | 5/2006 | Grach et al. | |
| 2006/0210409 A1 | 9/2006 | Sumner et al. | |
| 2007/0137942 A1 | 6/2007 | Weems et al. | |
| 2008/0017452 A1 | 1/2008 | Chen | |
| 2009/0127288 A1 | 5/2009 | Keller | |
| 2010/0001017 A1 * | 1/2010 | Herman et al. | 222/1 |
| 2012/0055951 A1 | 3/2012 | Herman et al. | |
| 2013/0081903 A1 * | 4/2013 | Alekseyev et al. | 184/26 |

FOREIGN PATENT DOCUMENTS

| | | |
|---|---|---|
| FR | 2626248 | 7/1989 |
| GB | 200041 | 7/1923 |
| GB | 276474 | 9/1927 |
| GB | 366314 | 2/1932 |
| GB | 406371 | 2/1934 |
| GB | 419506 | 11/1934 |
| GB | 744314 | 2/1956 |
| GB | 784252 | 10/1957 |
| GB | 1152732 | 5/1969 |
| GB | 1316077 | 5/1973 |
| GB | 1318022 | 5/1973 |
| GB | 2396390 | 6/2004 |
| JP | 57132576 | 8/1982 |

OTHER PUBLICATIONS

Milwaukee Electric Tool Corporation, "M12 Cordless Grease Gun," Operator's Manual, May 2010, 9 pages, Catalog No. 2446-20, Brookfield, USA.

PCT/US2012/050370 International Search Report and Written Opinion dated Nov. 30, 2012 (8 pages).

* cited by examiner

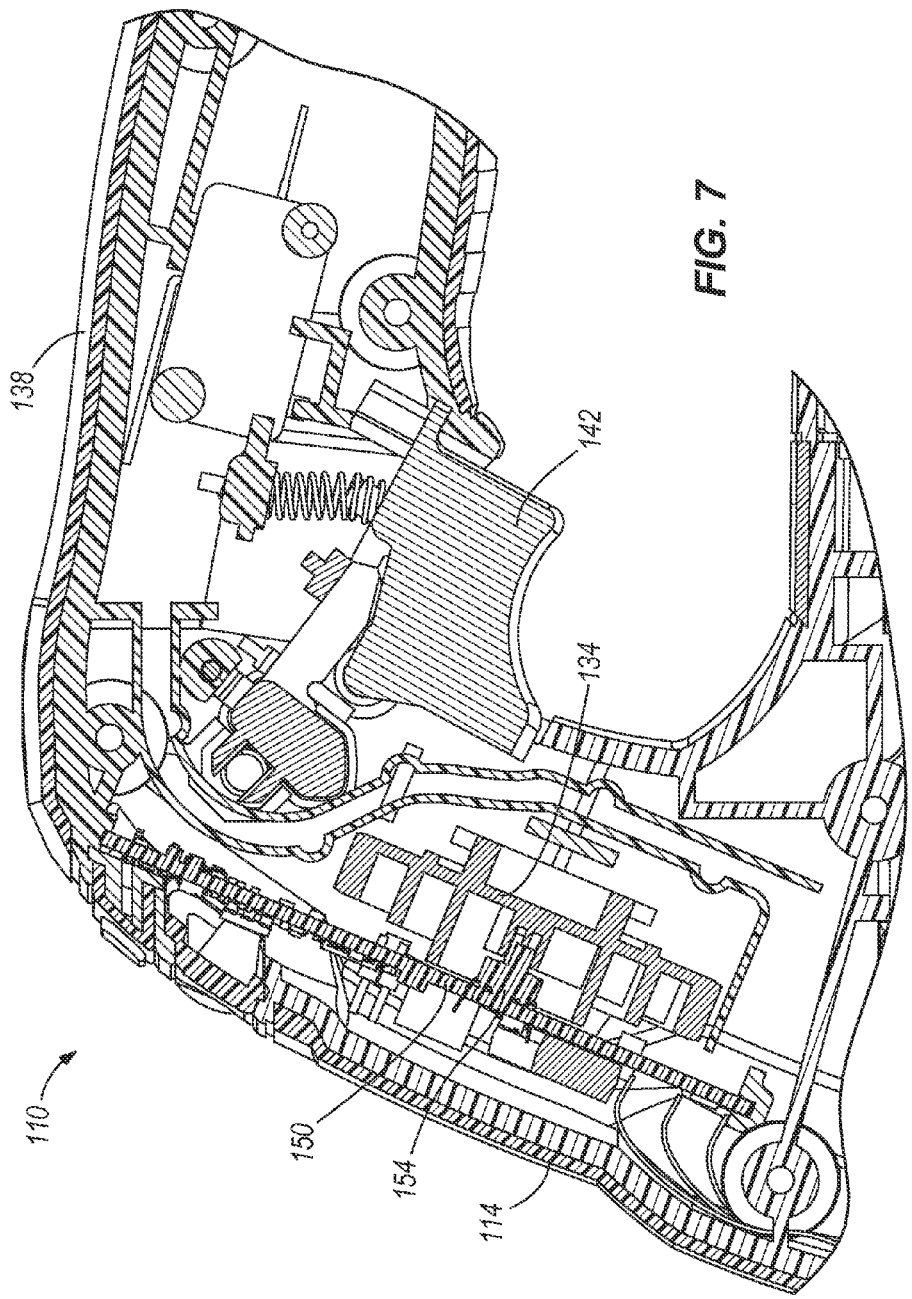

GREASE GUN

CROSS-REFERENCE TO RELATED APPLICATIONS

This application claims priority to U.S. Provisional Patent Application No. 61/521,903, filed Aug. 10, 2011, to U.S. Provisional Patent Application No. 61/521,987, filed Aug. 10, 2011, to U.S. Provisional Patent Application No. 61/612,835, filed Mar. 19, 2012, to U.S. Provisional Patent Application No. 61/612,846, filed Mar. 19, 2012, and to U.S. Provisional Patent Application No. 61/613,888, filed Mar. 21, 2012, the entire contents of all of which are hereby incorporated by reference.

This application is related to U.S. patent application Ser. No. 13/571,816, filed Aug. 10, 2012, by Troy C. Thorson et al. and titled "GREASE GUN", the entire contents of which is also hereby incorporated by reference.

FIELD

The present invention relates to grease guns and, more particularly, to grease guns including lubricant measurement systems.

BACKGROUND

Grease guns are commonly used in workshops, industry, and garages to apply lubricant (e.g., grease) to specific points on a piece of machinery. Grease guns typically include a coupler positioned on the end of a hose that can be fitted to grease fittings or zerks, which in turn provide fluid access to specific joints, gears, and other important parts of a machine. The grease gun then pumps lubricant into these points by way of a manual or powered pump.

SUMMARY

In one independent embodiment, the invention may generally provide a grease gun including a housing, a motor positioned within the housing, a pump assembly coupled to and driven by the motor, and a chamber supported by the housing in fluid communication with the pump assembly. The chamber is configured to store a liquid. The grease gun may also include an outlet in fluid communication with the chamber and a measurement system operable to measure an amount of liquid being dispensed through the outlet. The measurement system may monitor a change in current of the motor over a cycle of the pump assembly, compare the change in current to a predetermined value, and, if the change in current is greater than the predetermined value, increase a pump cycle counter to indicate that liquid was dispensed.

In another independent embodiment, the invention may generally provide a method of operating a grease gun. The grease gun may include a motor, a pump assembly coupled to the motor, a chamber in fluid communication with the pump assembly and configured to store a liquid, and an outlet in fluid communication with the chamber. The method may include driving the pump assembly with the motor to dispense liquid from the chamber through the outlet, monitoring a change in current of the motor over a cycle of the pump assembly, comparing the change in current of the motor to a predetermined value, and increasing a pump cycle counter, if the change in current is greater than the predetermined value, to indicate that liquid was dispensed.

Other independent aspects of the invention will become apparent by consideration of the detailed description, claims and accompanying drawings.

BRIEF DESCRIPTION OF THE DRAWINGS

FIG. 7 is a cross-sectional view of the portion of the grease gun shown in FIG. 6.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Figure 1:
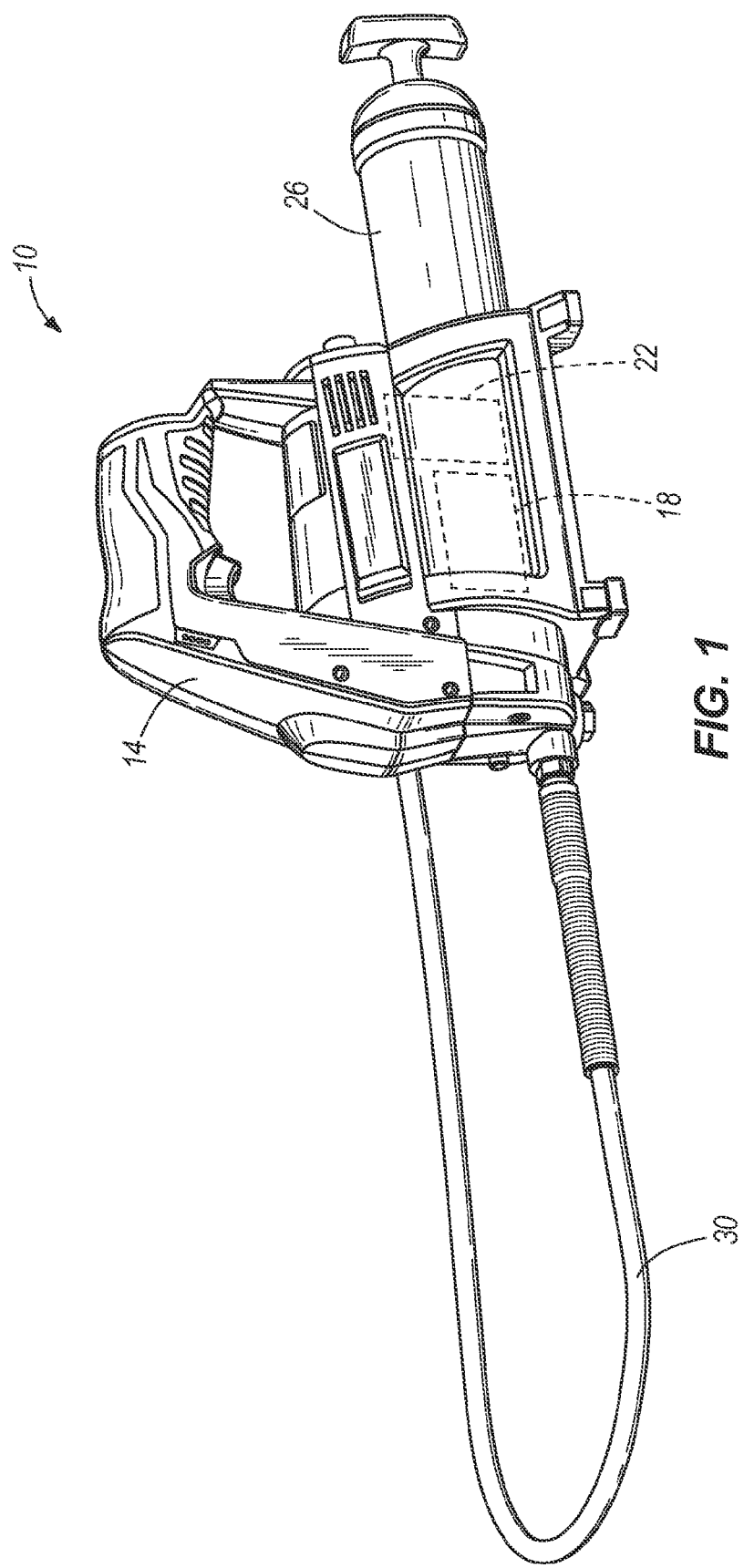
FIG. 1 is a perspective view of a grease gun embodying aspects of the invention.

FIG. 1 illustrates an electrically-powered grease gun 10. The illustrated grease gun 10 includes a housing 14, a motor 18 supported by and positioned within the housing 14, a pump assembly 22 coupled to and driven by the motor 18, a chamber 26 supported by the housing 14 in fluid communication with the pump assembly 22, and an output hose 30 in fluid communication with the chamber 26. In the illustrated embodiment, the chamber 26 is a barrel assembly that is configured to receive a lubricant cartridge. In other embodiments, the chamber 26 may be configured to directly receive and store a liquid, rather than a cartridge containing a liquid. In addition, the illustrated output hose 30 is a flexible hose that includes an outlet and is operable to dispense lubricant (or other liquids) from the chamber 26. In other embodiments, the output hose 30 may be a rigid hose having an outlet, or the output hose 30 may be omitted such that the outlet is directly formed on the housing 14 to dispense lubricant.

The illustrated motor 18 is powered by a power tool battery pack such as, for example, an 18V Li-ion battery pack. In other embodiments, the motor 18 may be powered by a battery pack having a different voltage and/or chemistry, or the grease gun 10 may be a corded power tool that is powered by an AC power source. In operation, the motor 18 drives the pump assembly 22 to pump lubricant from a lubricant cartridge positioned within the barrel assembly 26. The lubricant is pumped through the output hose 30 and dispensed from the grease gun 10 through a fitting, or other outlet, on the end of the hose 30.

Figure 2:
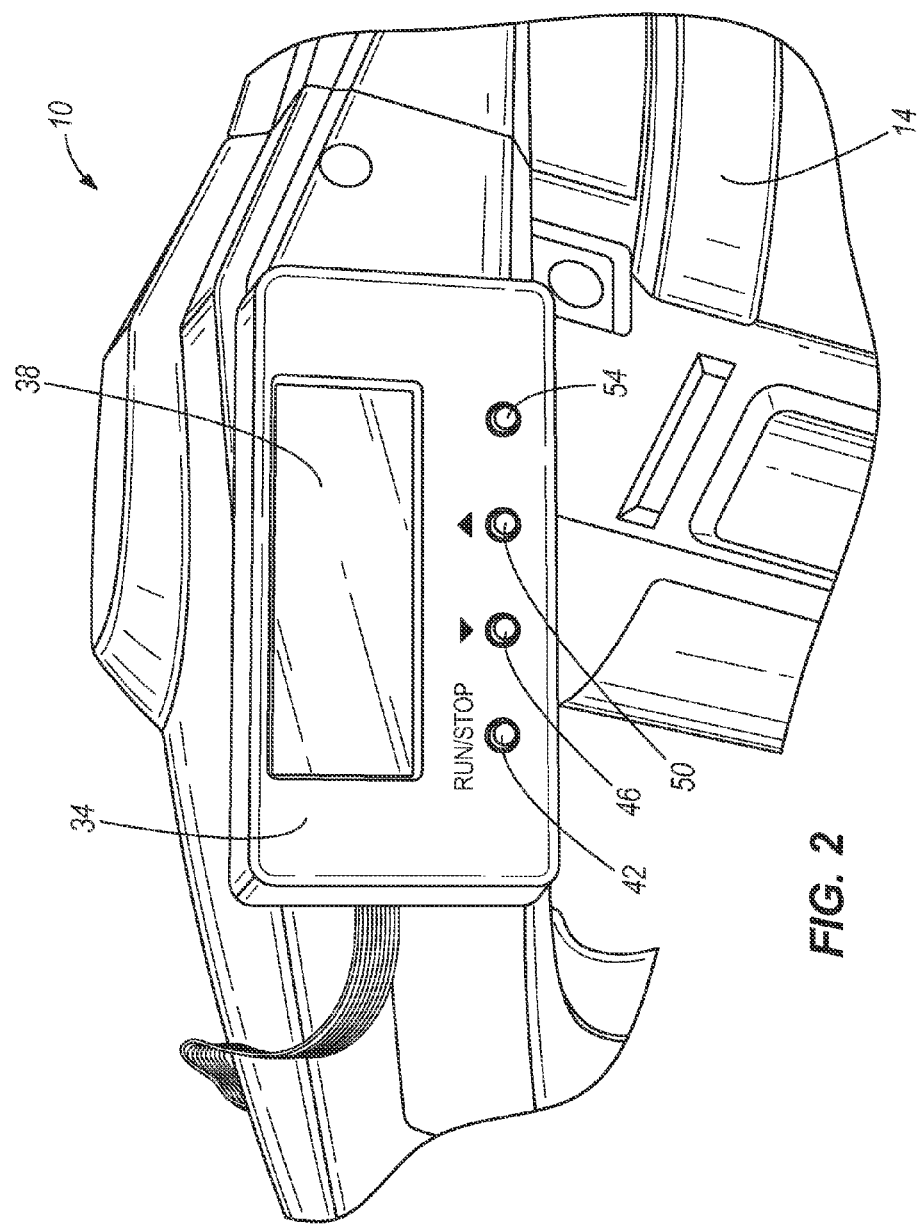
FIG. 2 is an enlarged view of a control panel on the grease gun shown in FIG. 1.

FIG. 2 illustrates a control panel 34 mounted on the grease gun 10. The illustrated control panel 34 is a separate unit that is permanently or removably coupled to the housing 14 of the grease gun 10. In other embodiments, the control panel 34 may be integrated into the housing 14 such that the entire grease gun assembly is a single unit.

The control panel 34 controls a lubricant measurement system of the grease gun 10, which may include a processor and a memory. In the illustrated embodiment, the lubricant measurement system monitors motor current during a pump cycle of the pump assembly 22 to determine the amount of lubricant (e.g., grease) being pumped and dispensed from the grease gun 10 through the output hose 30. In particular, the lubricant measurement system monitors the current being drawn by the motor 18 to determine the number of pump strokes performed by the pump assembly 22 that actually pump lubricant. In some embodiments, the number of pump strokes may then converted into a volume or weight of lubricant being dispensed by the gun 10. The lubricant measurement system can also count the number of strokes at both a high operating speed and a low operating speed of the motor 18. In other embodiments, the lubricant measurement system may count the number of pump strokes directly to determine the amount of lubricant being dispensed.

In the illustrated embodiment, the control panel 34 includes an LCD screen 38 and four manually operable actuators, or buttons, 42, 46, 50, 54. In other embodiments, the control panel 34 may include different types of display screens or actuators such as, for example, an LED screen and/or dials or switches. The illustrated screen 38 alternately displays a "Run" page and a "Stop" page. The "Run" page shows the amount of lubricant that has already been pumped and dispensed by the grease gun 10. The "Stop" page allows a user to set the amount of lubricant to be pumped and dispensed by the gun 10. Actuating (e.g., depressing) the first button 42 switches between these pages. Actuating the second and third buttons 46, 50 adjusts the values on each page. Actuating the fourth button changes the units displayed on the screen 38. For example, the screen 38 can display the amount of lubricant already pumped or to be pumped in ounces, grams, or number of pump strokes. In such embodiments, the control panel 34 automatically converts the number of pump strokes counted or to be counted by the lubricant measurement system into a volume or weight of lubricant already dispensed or to be dispensed. In other embodiments, the screen 38 may display the amount of lubricant already pumped or to be pumped in other units. In some embodiments, the control panel 34 may display maximum values of 15.88 ounces, 450.0 grams, or 794 pump strokes. Additionally or alternatively, the control panel 34 may also include a reset button to reset (e.g., zero) the volume, weight, and/or number of pump strokes currently displayed on the screen 38.

Figure 3:
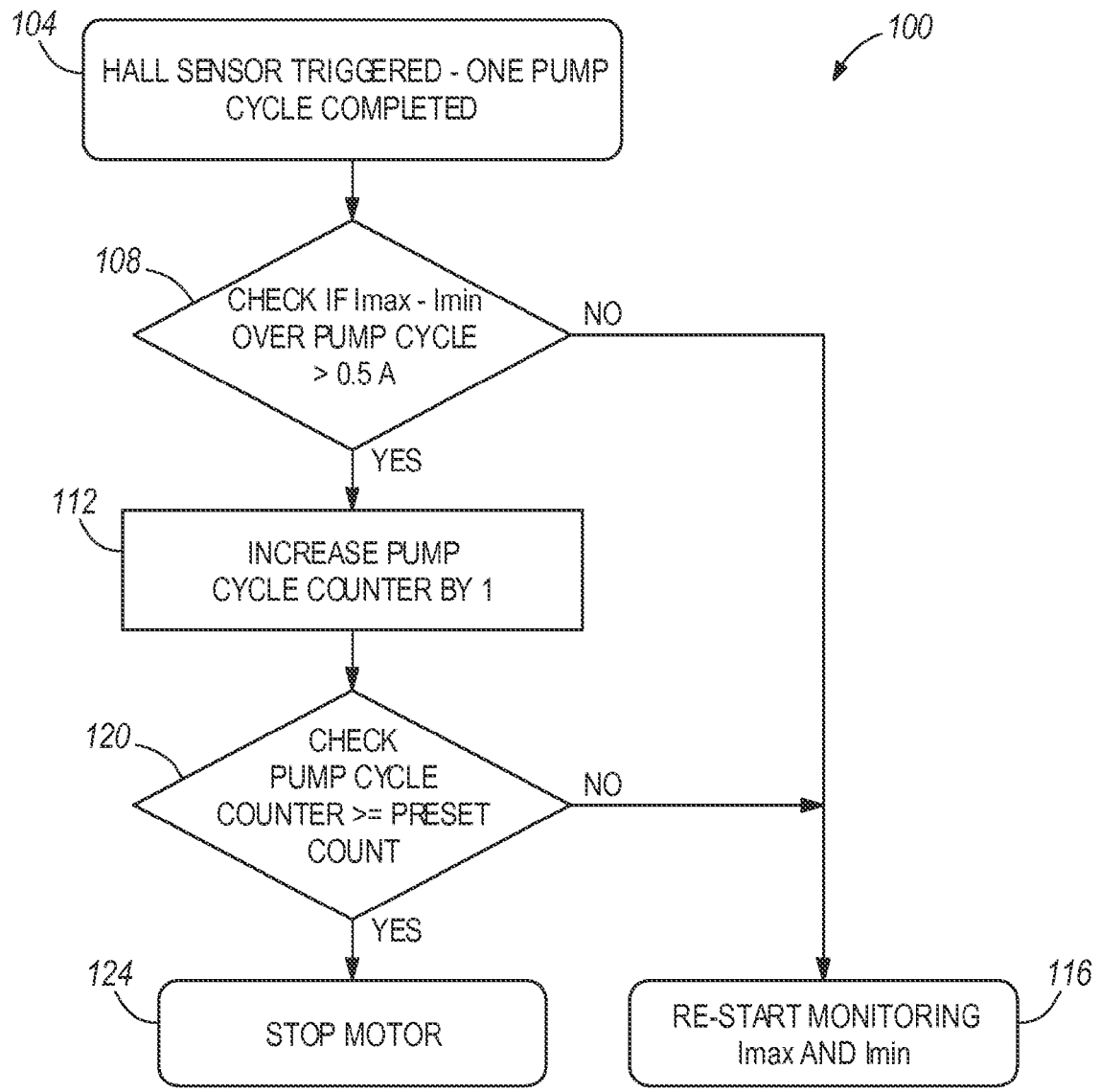
FIG. 3 is a flowchart depicting operation of a lubricant measurement system of the grease gun.

FIG. 3 is a flowchart 100 depicting operation of the lubricant measurement system of the grease gun 10. When the grease gun 10 is operated (e.g., when a trigger or other suitable actuator is actuated to energize the motor 18 and drive the pump assembly 22), the processor and the memory of the lubricant measurement system continuously collect and store operating characteristics (e.g., current draw) of the motor 18. As operation of the grease gun 10 proceeds, a Hall sensor, or other suitable sensor, of the lubricant measurement system is triggered by a magnet at step 104. The Hall sensor is positioned in the housing 14 (FIG. 1) and coupled to the pump assembly 22 to monitor movement (e.g., pump strokes) of the pump assembly 22. The Hall sensor is also electrically coupled in communication with the processor of the lubricant measurement system. Triggering the Hall sensor indicates that one pump cycle is completed. The processor correlates the stored current draw of the motor 18 over this time period (e.g., the time since the Hall sensor was last triggered) with the pump cycle identified by the Hall sensor.

At step 108, the lubricant measurement system checks if the change in current of the motor 18 (e.g., Imax of the motor 18 minus 1 min of the motor 18) over the pump cycle is greater than a predetermined value. In the illustrated embodiment, the lubricant measurement system checks if the change in current is greater than approximately 0.5 amps. This predetermined value indicates whether the grease gun 10 actually pumped lubricant during the measured pump cycle. Changes in current that are smaller than 0.5 amps may occur when, for example, an air bubble is in the pump assembly 22 or the lubricant cartridge in the barrel assembly 26 is empty. In other embodiments, the predetermined value may be set at a larger or smaller value than 0.5 amps, depending on the configuration of the grease gun 10 and the type of components (e.g., motor, pump assembly, lubricant, etc.) being used.

If the change in current is greater than the predetermined value, the lubricant measurement system increases a pump cycle counter by 1 at step 112. If the change in current is not greater than the predetermined value, the lubricant measurement system does not increase the pump cycle counter such that the pump cycle counter is held or maintained at its previous value. After either scenario, the lubricant measurement system continues to monitor the motor current at step 116 until the Hall sensor is triggered again at step 104. By not increasing the pump cycle counter when the change in current is less than the predetermined value, the lubricant measurement system compensates for pump strokes that do not actually pump and dispense lubricant from the grease gun 10.

After the pump cycle counter is increased, the lubricant measurement system compares the pump cycle counter to a preset count at step 120. In the embodiment shown in FIG. 2, the preset count is programmed by a user with the control panel 34. As noted above, the user may set the preset count as a volume of lubricant to be dispensed, a weight of lubricant to be dispensed, or a number of pump strokes to be performed by the pump assembly 22. If the pump cycle counter is greater than or equal to the preset count, the lubricant measurement system stops the motor 18 at step 124 to stop dispensing lubricant from the grease gun 10. If the pump cycle counter is not greater than or equal to the preset count (i.e., if the pump cycle counter is less than the preset count), the lubricant measurement system continues to monitor the motor current at step 116 until the Hall sensor is triggered again at step 104.

In some embodiments, the grease gun 10 may include means to compensate for cylinder blow past lubricant by simultaneously measuring the number of pump strokes and an output pressure of the lubricant. The output pressure may be measured directly or may be inferred from the motor current measurement. If the measured output pressure is greater than a predetermined threshold value, the grease gun 10 may provide an indication to the user and/or shutoff power to the motor 18. Monitoring the output pressure may also help prevent damage to gears of the motor 18 or the pump assembly 22 and to the output hose 30 if the hose 30 becomes blocked.

In some embodiments, the grease gun 10 may include means to remotely actuate the gun 10 from either an end of a hose proximate a location being lubricated or from a tool handle. The means may include a remote trigger having a light. The means may also include a small plug, a small plug inside a shutter, or another optical part positioned on the grease gun 10. The plug could be attached to the grease gun 10 after the output hose 30 is connected to the gun 10.

Figure 4:
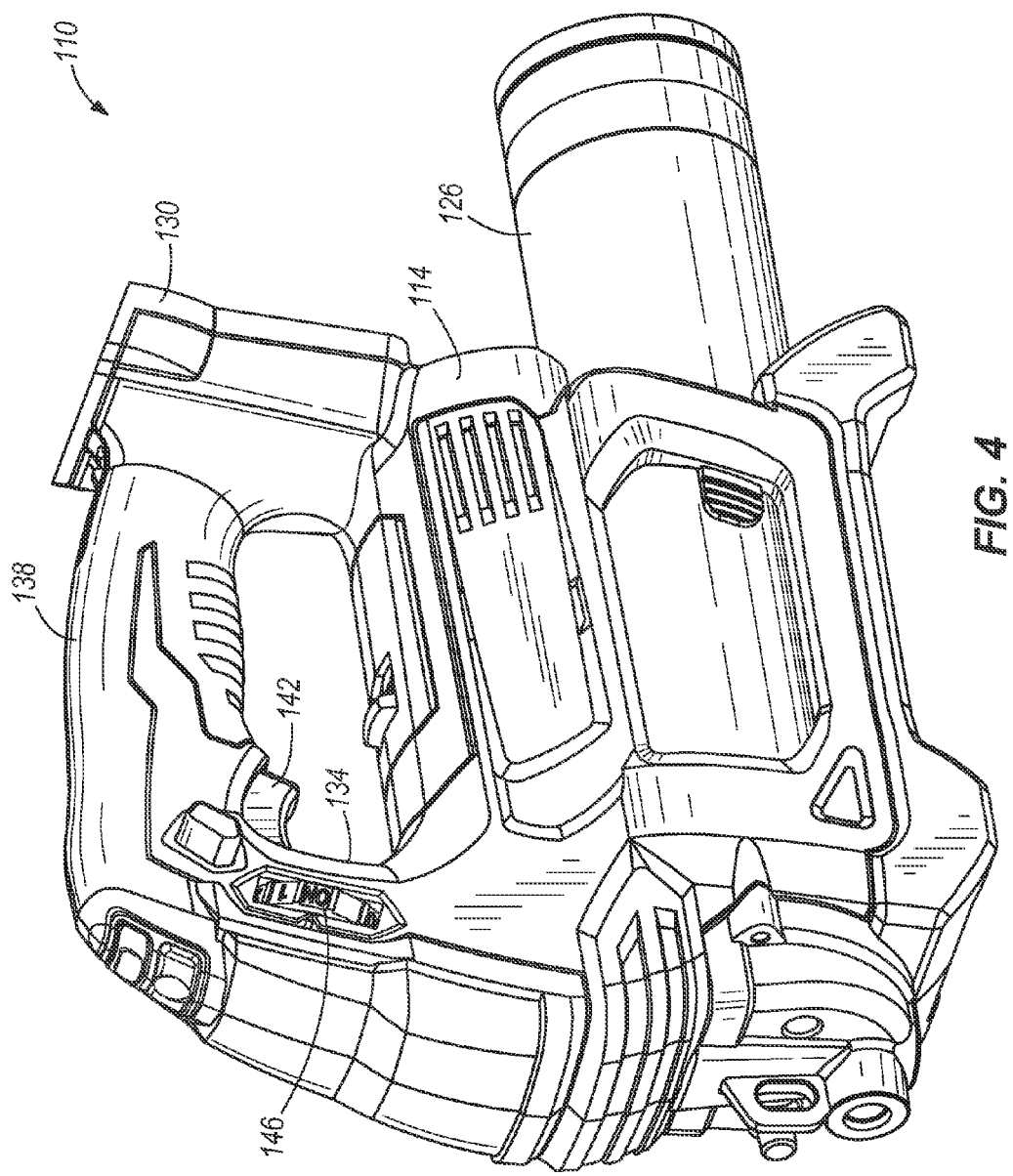
FIG. 4 is a perspective view of another grease gun embodying aspects of the invention.
Figure 5:
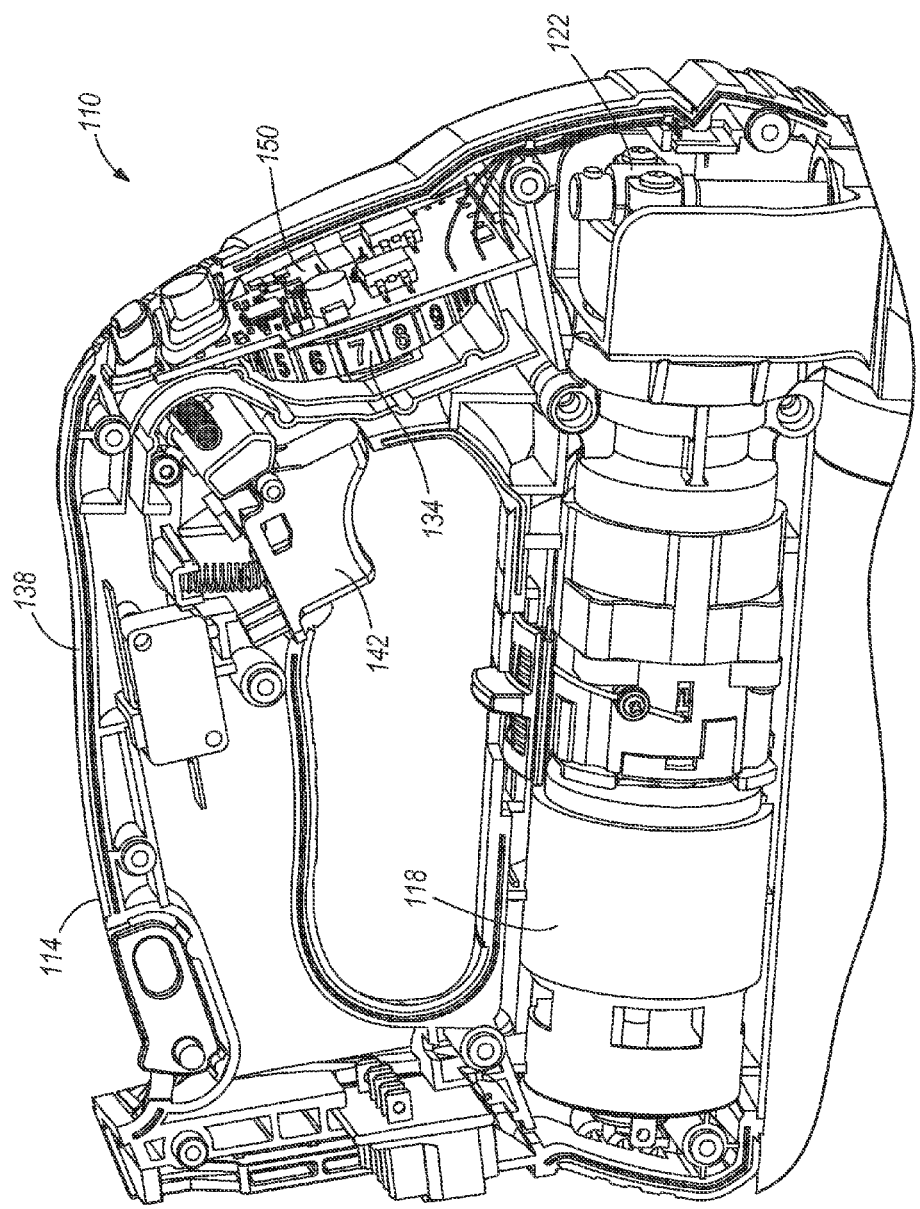
FIG. 5 is a perspective view of a portion of the grease gun shown in FIG. 4 with a housing portion removed.

FIGS. 4 and 5 illustrate another embodiment of an electrically-powered grease gun 110. Similar to the grease gun 10 discussed above, the illustrated grease gun 110 includes a housing 114, a motor 118 supported by and positioned within the housing 114, a pump assembly 122 coupled to and driven by the motor 118, and a chamber 126 supported by the housing 115 in fluid communication with the pump assembly 122. The housing 114 includes a battery connection portion 130 configured to support a battery pack and connect the battery pack to the motor 118. Although not shown, the grease gun 110 may also include an output hose having an outlet in fluid communication with the chamber 126.

The grease gun 110 further includes a lubricant measurement system that determines the amount of lubricant (e.g., grease) being pumped and dispensed from the grease gun 110 during operation. The lubricant measurement system functions in a similar manner to the lubricant measurement system described above with reference to FIGS. 2 and 3, but includes a manual actuator 134 rather than the control panel 34 to control the system. In the illustrated embodiment, the manual actuator 134 includes a rotatable dial. In other embodiments, the manual actuator 134 may include a knob, a switch, a lever, or any other suitable actuator that can be manipulated by a user.

As shown in FIG. 4, the illustrated dial 134 is supported by the housing 114 near a handle portion 138 and a trigger 142 of the grease gun 110. The dial 134 is positioned mostly within the housing 114, but a relatively small portion of the dial 134 extends outwardly through an opening in the housing 114 such that the dial 134 is accessible by a user. A series of values that represent numbers of pump strokes to be performed is listed on the outer surface of the dial 134. An indicator 146 is formed on the housing 114 adjacent the portion of the dial 134 that extends through the housing 114. The indicator 146 identifies for a user the current setting of the dial 134.

Figure 6:
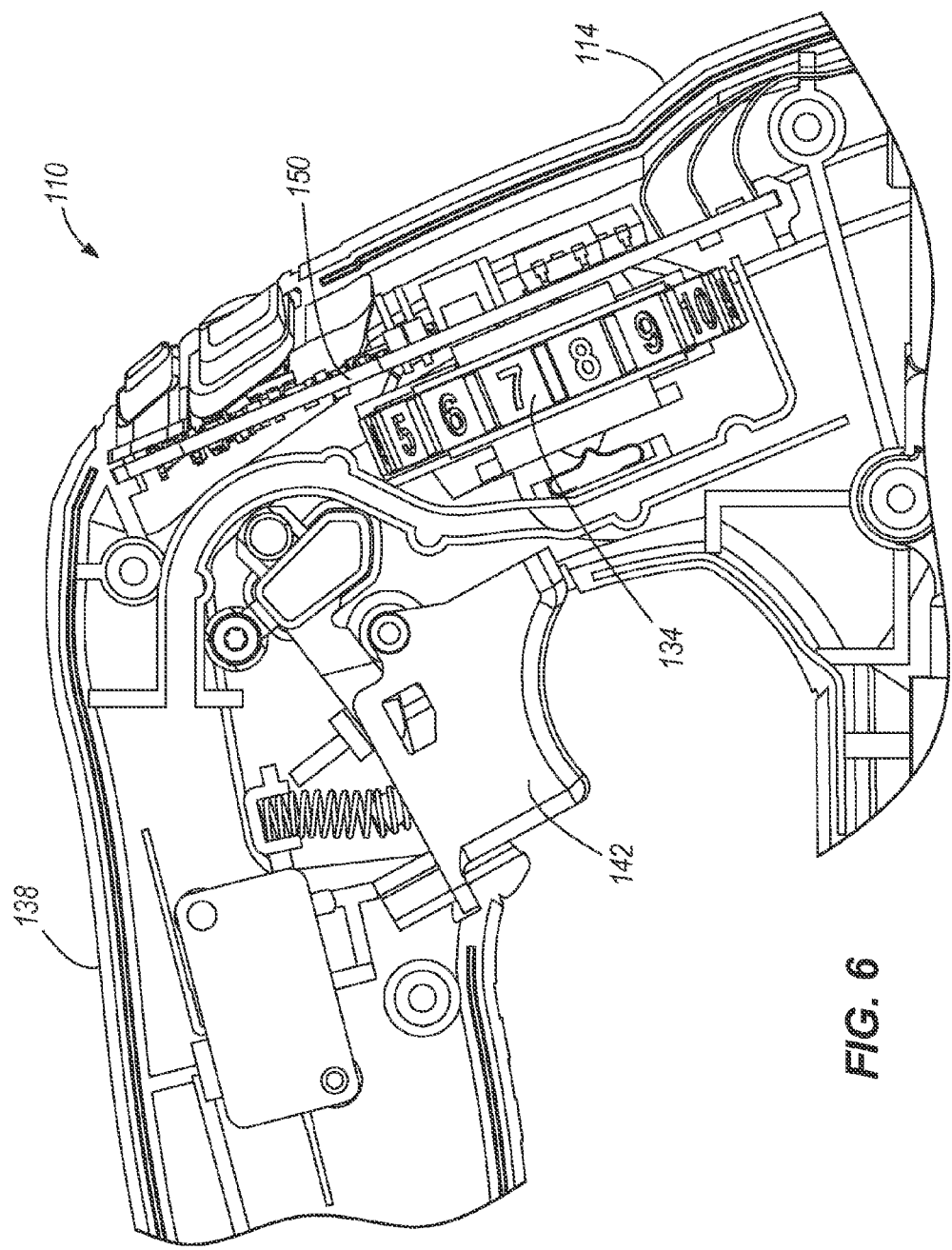
FIG. 6 is an enlarged view of another portion of the grease gun shown in FIG. 4.

As shown in FIGS. 5-7, the dial 134 is coupled to a circuit board 150, which includes the processor and the memory of the lubricant measurement system. The circuit board 150 is mounted within a forward end portion of the housing 114, and the dial 134 is rotatably mounted on a boss 154 extending from the circuit board. By rotating the dial 134, a user can set the number of pump strokes that will be performed by the grease gun 110 when the trigger 142 is actuated. For example, the dial 134 may be set such that the grease gun 110 performs 1, 2, 3, 4, 5, 6, 7, 8, 9, 10, 15, 20, 25, or 50 pump strokes when the trigger 142 is actuated. The number of pump strokes to be performed is identified by the corresponding values on the dial 134. When the set number of pump strokes is reached, the motor 118 automatically shuts down so that the pump assembly 122 does not continue to operate and dispense lubricant from the grease gun 110. In other embodiments, additional or alternative numbers of pump strokes may be available using the dial 134. In the illustrated embodiment, the dial 134 also includes an ON setting. In this setting, the motor 118 and the pump assembly 122 operate continuously until the trigger 142 is released.

Although the invention has been described in detail with reference to certain preferred embodiments, variations and modifications exist within the scope and spirit of one or more independent aspects of the invention as described. For example, although the fluid measurement system has been described with reference to a grease gun, the fluid measurement system may also be employed with other types of motorized fluid dispensers, such as caulk guns, soap or cleaner dispensers, paint sprayers or dispensers, or the like. Furthermore, these dispensers may be used to dispense other types of liquids (e.g., caulk, soap, paint, etc.) instead of a lubricant.

One or more independent features and advantages of the invention may be set forth in the following claims:

The invention claimed is:

1. A grease gun comprising:
a housing;
a motor positioned within the housing;
a pump assembly coupled to and driven by the motor;
a chamber supported by the housing and in fluid communication with the pump assembly, the chamber being configured to store a liquid;
an outlet in fluid communication with the chamber; and
a measurement system operable to measure an amount of liquid being dispensed through the outlet, the measurement system monitoring a change in current of the motor over a cycle of the pump assembly, comparing the change in current to a predetermined value, and, if the change in current is greater than the predetermined value, increasing a pump cycle counter to indicate that liquid was dispensed.

2. The grease gun of claim 1, wherein the measurement system does not increase the pump cycle counter if the change in current is less than the predetermined value.

3. The grease gun of claim 1, further comprising an actuator supported by the housing and coupled to the measurement system, the actuator being operable to set a preset count.

4. The grease gun of claim 3, wherein the measurement system stops the motor when the pump cycle counter is greater than or equal to the preset count.

5. The grease gun of claim 3, wherein the preset count represents a number of pump strokes to be performed by the pump assembly.

6. The grease gun of claim 5, wherein the preset count is set by the actuator as one of a volume of liquid to be dispensed and a weight of liquid to be dispensed, and wherein the measurement system converts the preset count to the number of pump strokes to be performed by the pump assembly.

7. The grease gun of claim 3, wherein the actuator includes a rotatable dial.

8. The grease gun of claim 7, wherein at least a portion of the rotatable dial extends outwardly through an opening in the housing.

9. The grease gun of claim 1, wherein the predetermined value is approximately 0.5 amps.

10. The grease gun of claim 1, wherein the chamber includes a barrel assembly configured to receive a lubricant cartridge.

11. The grease gun of claim 1, further comprising an output hose coupled to the housing and in fluid communication with the chamber, the output hose including the outlet.

12. The grease gun of claim 1, further comprising a trigger supported by the housing and electrically coupled to the motor, the trigger being actuatable to energize the motor.

13. A method of operating a grease gun, the grease gun including a motor, a pump assembly coupled to the motor, a chamber in fluid communication with the pump assembly and configured to store a liquid, and an outlet in fluid communication with the chamber, the method comprising:
driving the pump assembly with the motor to dispense liquid from the chamber through the outlet;
monitoring a change in current of the motor over a cycle of the pump assembly;
comparing the change in current of the motor to a predetermined value; and
if the change in current is greater than the predetermined value, increasing a pump cycle counter to indicate that liquid was dispensed.

14. The method of claim 13, further comprising holding the pump cycle counter constant if the change in current is less than the predetermined value.

15. The method of claim 13, further comprising setting a preset count that represents a number of pump strokes to be performed by the pump assembly.

16. The method of claim 15, further comprising stopping the motor when the pump cycle counter is greater than or equal to the preset count.

17. The method of claim 15, wherein the grease gun also includes an actuator, and wherein the method further comprises actuating the actuator to set the preset count.

18. The method of claim 17, wherein actuating the actuator includes actuating the actuator to input the preset count as one of a volume of fluid to be dispensed and a weight of fluid to be dispensed, and wherein the method further comprises converting the preset count to the number of pump strokes to be preformed by the pump assembly.

19. The method of claim 13, wherein the predetermined value is approximately 0.5 amps.

20. The method of claim 13, wherein the grease gun also includes a trigger electrically coupled to the motor, and wherein the method further comprises actuating the trigger to energize the motor.

\* \* \* \* \*